Dec. 22, 1936.  J. WETZEL  2,065,164
NONDAZZLING PROJECTOR
Filed June 12, 1933
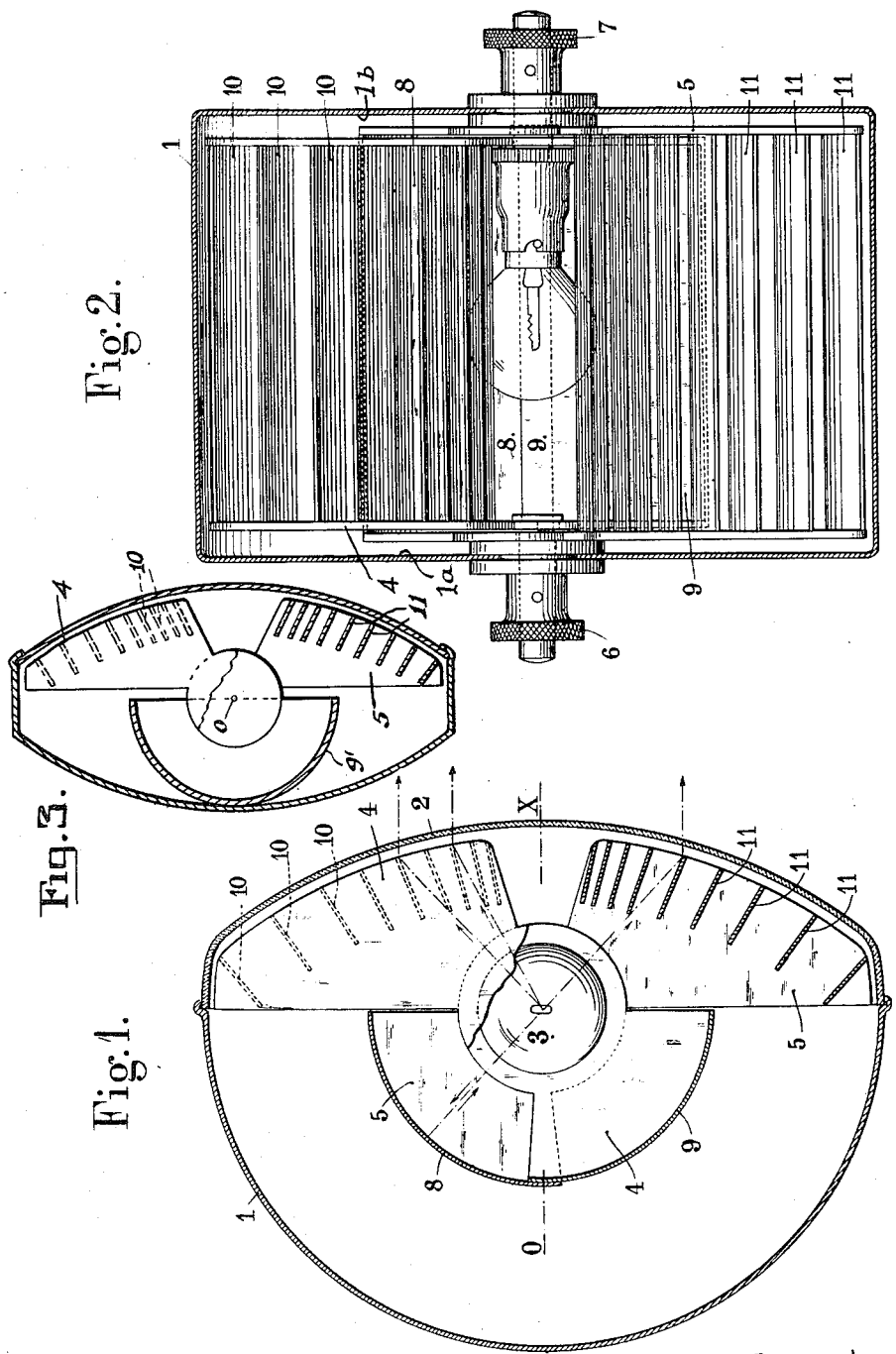

Patented Dec. 22, 1936

2,065,164

UNITED STATES PATENT OFFICE 2,065,164

NONDAZZLING PROJECTOR

Joseph Wetzel, Paris, France

Application June 12, 1933, Serial No. 675,478
In France June 16, 1932

7 Claims. (Cl. 240—41.35)

This invention has for its object a light projector designed to intercept as much as possible of the light flux emitted by a light source and to direct said flux in a perfectly limited manner through a definite portion of the space so that dazzling shall be completely suppressed outside the space swept by the said flux, such result being attained together with the best possible efficiency from the viewpoint of flux utilization. Moreover, the arrangements as described have the advantage to provide perfectly defined light bunches useful for signalling definite portions of the space as this is necessary in the case e. g. of land and sea searchlights.

The said result is attained by combining a reflector of either spherical or cylindrical shape depending on the purpose, with a system of reflecting blades so arranged that both the rays directly emitted by the source and those which are already reflected by the reflector will be reflected thereby in the desired direction.

It is well known that with ordinary searchlights all the portion of space defined by the cone having the light source for its apex and the edge of the reflector for its generatrix is illuminated directly by the source. A considerable amount of the light emitted thus becomes dispersed without it being possible to control the direction thereof. This results in a poor utilization of the light and is a cause of dazzling effects in those portions of the space towards which directing the rays is not intended. It is possible to intercept the direct or unreflected rays by means of a spherical mirror arranged in front of the light source and to reflect them onto the reflector, but such a mirror stops a notable portion of the reflected bundle and consequently lowers the efficiency of the searchlight.

According to this invention, the said inconveniences are obviated by the combination, with a reflector having an outline in the shape of an arc of a circle concentric with the light source, of a series of reflecting blades distributed at either side of the axis of the projector and set in such manner that both the rays emitted directly by the light source and those which are already reflected by the reflector shall be reflected thereby in the desired direction.

Figure 1 is an axial section of the projector.

Fig. 2 is a front view.

Fig. 3 is a diagrammatic view showing a semispherical reflector.

The said projector comprises a casing 1 closed at the front by a glass pane 2 and in which a light source 3 is disposed on a transverse axis. On the side walls 1a, 1b of the casing 1 are pivotally mounted two supports 4 and 5 whose axes of rotation coincide with the axis of the light source 3 and each of which is connected with an operating knob 6 and 7, respectively, placed outside the casing 1.

The reflector of the said projector has a half-circular right section which is concentric to the light source 3; the same comprises an upper element 8 and a lower element 9, which are separate, the one from the other, and so devised as to be able to slide the one upon the other. These two elements are respectively connected, the one, 8, to the lower support 5 and the other, 9, to the upper support 4.

Each of the said supports moreover carries a group of reflecting blades 10 and 11 respectively, placed parallel to the axis of the light source and provided with rectilinear longitudinal edges. These blades are inclined and spaced so as to reflect in the required direction the light rays coming directly from the source 3 as well as those which are already reflected by the reflector 8, 9. In the example as shown, the blades 10, 11 are inclined so as to converge the rays into a beam which is reflected substantially parallel to the axis OX of the projector. The width and the spacing of the blades are so selected as to come flush with the external edges of the following blades, in order that the whole of the light bundle will be reflected by the various blades without it being possible for any ray to pass out freely from the projector except perhaps for a narrow central bundle.

The intervals between the blades decrease in coming closer to the axis OX and one is practically obliged to leave at the center a free space through which the rays coming from the source pass directly. When it is desired to avoid every dazzling, the said space can be shut off by means of a diffusing glass, a lens, an opaque screen and the like.

Considering that in the represented description, the two groups of reflecting blades 10 and 11 are each connected to one of the supports 4 and 5, that the one can be caused to rotate relatively to the other by operating them by means of external knobs 6 and 7, it is possible to move away or closer the one to the other at will the two beams of light reflected by the two groups of blades, so as to modify the angle of projection relatively to the axis of the projector. Considering furthermore that each element of the reflector is connected to the support which carries the corresponding blades, the relative distance between the said element of the reflector and the corresponding blades will not be modified by the alteration in the orientation of the whole.

In Fig. 3, 9' designates a semi-spherical reflector the light source being substantially a point.

I claim:

1. A searchlight comprising a reflector having a profile in the shape of an arc of a circle and consisting of two independently movable arcs, a source of light located at the center of curvature of this reflector, and two series of reflecting blades, a support for each of said series rigidly connected to one of said arcs and an axis on which said support is rotatably mounted, said series of reflecting blades being placed in front of the source of light inclined and adapted to reflect forwardly, and inside a dihedron the edge of which is parallel to the generatrices of the blades, the light rays coming directly from the source of light and those already reflected by the reflector, said blades being spaced in such a manner that no direct ray from the source of light or from the reflector is allowed to emerge therebetween except in the vicinity of the axis of the profile of the reflector.

2. A projector comprising a cylindrical reflector of half-circular right section, a light source placed at the center of curvature of the said reflector, two groups of plane reflecting blades, at right angles to the vertical plane passing through the axis of the projector, placed transversely in front of the reflector and the light source, the one of these groups being placed above and the other under the axis of the reflector, two supports pivotally and concentrically mounted about a transversal axis passing through the light source and carrying the one the blades of the upper group and the other the blades of the lower group, the said blades being so inclined and spaced as to reflect forwardly and inside a dihedron the edge of which is parallel to the blades all the rays coming directly from the source and all those which are reflected by the reflector except in the vicinity of the axis of the projector.

3. A projector comprising a cylindrical reflector of half-circular right section and composed of two separate halves, a light source placed at the center of curvature of the said reflector, two groups of plane reflecting blades at right angles to the vertical plane passing through the axis of the projector and placed transversely in front of the reflector and the light source, the one of the groups being placed above and the other under the axis of the reflector, two supports pivotally mounted about a transverse axis passing through the light source and carrying the one the blades of the upper group and the lower half of the said reflector and the other the blades of the lower group and the upper half of the said reflector, the said blades being inclined and spaced so as to reflect forwardly and inside a dihedron the edge of which is parallel to the blades all the rays coming directly from the source, and all those which are reflected by the reflector except in the vicinity of the axis of the projector.

4. A projector comprising a cylindrical reflector of half-circular right section and composed of two separate halves, a light source placed at the center of curvature of the said reflector, two groups of plane reflecting blades at right angles to the vertical plane passing through the axis of the projector and placed transversely in front of the reflector and the light source, the one of the groups being placed above and the other under the axis of the reflector, two supports pivotally mounted about the axis of the light source and carrying the one the blades of the upper group and the lower half of the said reflector and the other, the blades of the lower group and the upper half of the said reflector, the said blades being inclined and spaced so as to reflect forwardly and inside a dihedron the edge of which is parallel to the blades all the rays coming directly from the source and all those which are reflected by the reflector except in the vicinity of the axis of the projector, and an operating knob mounted on each one of the said supports.

5. A projector comprising a reflector having a straight section of semi-circular shape, a source of light placed at the center of curvature of said reflector and two groups of reflecting blades located on either side of the axis of the projector, said blades having rectilinear edges, parallel to each other and orthogonal to the axis of the projector and these blades being arranged in front of the source of light so as to allow to pass between them, whilst reflecting them forwardly, all the rays coming from the source of light and coming from the reflector, and means for separately determining the inclination of the blades of both groups so that all the rays should be included in a dihedron the edge of which is parallel to the generatrices of the blades.

6. A projector as claimed in claim 5, in which the reflector having a semi-circular straight section is of spherical shape.

7. A projector as claimed in claim 5, in which the reflector having a semi-circular straight section is of cylindrical shape and the reflecting blades are arranged parallel to the axis of the reflector.

JOSEPH WETZEL.